(12) United States Patent
Kim et al.

(10) Patent No.: US 8,068,471 B2
(45) Date of Patent: Nov. 29, 2011

(54) METHOD AND APPARATUS FOR SCHEDULING MULTIPLE USERS IN A COMMUNICATION SYSTEM

(75) Inventors: Yu-Seok Kim, Seoul (KR); In-Soo Hwang, Yongin-si (KR); Young-Ho Jung, Suwon-si (KR); Myeon-Kyun Cho, Sungnam-si (KR); Hyung-Myung Kim, Daejeon (KR); Tae-Sung Kang, Seoul (KR); Woo-Geun Ahn, Yeongcheon-si (KR); Dae-Hyun Kim, Seongnam-si (KR)

(73) Assignees: Samsung Electronics Co., Ltd., Suwon-si (KR); Korea Advanced Institute of Science and Technology, Daejeon (KR)

(*) Notice: Subject to any disclaimer, the term of this patent is extended or adjusted under 35 U.S.C. 154(b) by 926 days.

(21) Appl. No.: 12/043,866

(22) Filed: Mar. 6, 2008

(65) Prior Publication Data

US 2008/0219194 A1  Sep. 11, 2008

(30) Foreign Application Priority Data

Mar. 6, 2007  (KR) .................. 10-2007-0022102

(51) Int. Cl.
*H04B 7/00* (2006.01)
(52) U.S. Cl. .................. 370/339; 370/338; 370/203
(58) Field of Classification Search .............. 370/339
See application file for complete search history.

(56) References Cited

U.S. PATENT DOCUMENTS

| 7,298,805 | B2 | 11/2007 | Walton et al. | |
|---|---|---|---|---|
| 7,463,601 | B2* | 12/2008 | Lee et al. | 370/328 |
| 7,532,911 | B2 | 5/2009 | Kwun et al. | |
| 7,554,952 | B2* | 6/2009 | Kogiantis et al. | 370/334 |
| 7,764,658 | B2* | 7/2010 | Garrett et al. | 370/336 |
| 2004/0042427 | A1* | 3/2004 | Hottinen | 370/335 |
| 2004/0190643 | A1* | 9/2004 | Liu et al. | 375/295 |
| 2006/0209764 | A1 | 9/2006 | Kim et al. | |
| 2008/0267108 | A1* | 10/2008 | Zhang et al. | 370/312 |
| 2009/0233560 | A1* | 9/2009 | Lee et al. | 455/69 |
| 2009/0285322 | A1* | 11/2009 | Imamura et al. | 375/267 |

FOREIGN PATENT DOCUMENTS

| KR | 10-2006-0079877 A | 7/2006 |
|---|---|---|
| KR | 10-2006-0094985 A | 8/2006 |
| KR | 10-2006-0096365 A | 9/2006 |
| KR | 10-2006-0104200 A | 10/2006 |

* cited by examiner

*Primary Examiner* — Jeffrey Pwu
*Assistant Examiner* — Sulaiman Nooristany
(74) *Attorney, Agent, or Firm* — Jefferson IP Law, LLP

(57) ABSTRACT

A method and apparatus for scheduling multiuser terminals in a communication system is provided. A receiver receives feedback information from a plurality of user terminals. A user grouping unit selects terminals having a maximum Signal to Interference plus Noise Ratio (SINR) among terminals having the same beam index and beam subset index, from among the plurality of user terminals, and generates terminal groups using the selected terminals, each terminal group including terminals having the same beam subset index. A group scheduling unit calculates a throughput of each of the terminal groups to determine which terminal group has the maximum throughput. A random precoding unit generates random beam vectors corresponding to terminals included in the terminal group determined to have the maximum throughput, and transmits data for user terminals, included in the terminal group determined to have the maximum throughput, over the generated random beam vectors.

10 Claims, 8 Drawing Sheets

METHOD AND APPARATUS FOR SCHEDULING MULTIPLE USERS IN A COMMUNICATION SYSTEM

PRIORITY

This application claims the benefit under 35 U.S.C. §119 (a) of a Korean patent application filed in the Korean Intellectual Property Office on Mar. 6, 2007 and assigned Serial No. 2007-22102, the entire disclosure of which is hereby incorporated by reference.

JOINT RESEARCH AGREEMENT

The presently claimed invention was made by or on behalf of the below listed parties to a joint research agreement. The joint research agreement was in effect on or before the date the claimed invention was made and the claimed invention was made as a result of activities undertaken within the scope of the joint research agreement. The parties to the joint research agreement are Samsung Electronics Co., Ltd. and the Korea Advanced Institute of Science And Technology.

BACKGROUND OF THE INVENTION

1. Field of the Invention

The present invention relates to a method and apparatus for scheduling multiple users in a communication system. More particularly, the present invention relates to a method and apparatus for scheduling multiple user terminals depending on partial channel information in a Multiple Input Multiple Output (MIMO) based communication system using multiple transmit/receive antennas.

2. Description of the Related Art

In a MIMO communication system including M transmit antennas, N receive antennas and K user terminals, when there is only a K=1 single user terminal, a multiplexing gain of the transmit antennas and the receive antennas is proportional to a minimum value min(M,N) between M and N. On the other hand, when there are K≧2 multiple user terminals, multiuser interference occurs between user terminals (hereinafter referred to as 'multiuser terminals') which are multiplexed with the transmit antennas. Therefore, a multiplexing gain is proportional to a minimum value min(M,K) between M and K. Thus, various methods have been proposed which perform multiplexing while canceling the multiuser interference between multiuser terminals.

FIG. 1 is a diagram illustrating a conventional configuration of a MIMO communication system.

Referring to FIG. 1, a base station 100 includes four transmit antennas 102 ~108, and user terminal #1 110 through user terminal #4 116 that each include one receive antenna.

For example, for the transmit antenna 102, when one multiplexing channel is established with the user terminal #1 110, interference to the other user terminal #2 112 through terminal #4 116 occurs. Similarly, for each of the transmit antennas 102 ~108, when one multiplexing channel is established to one associated user terminal, interference occurs to the remaining three user terminals except for the user terminal with which the multiplexing channel is established.

A Dirty Paper Coding (DPC) method has been proposed to cancel interference between a base station and user terminals in the MIMO communication system of FIG. 1. With the DPC method, optimal multiplexing is performed while canceling the multiuser interference between multiuser terminals using antenna channel information of all user terminals. However, it is difficult to apply the DPC method to a real-world system, since the system implementing the DPC method would need the antenna channel information of all of the user terminals.

Partial Channel State Information (PCSI) has been proposed to address the deficiencies of the DPC method. PCSI includes Signal to Interference plus Noise Ratio (SINR), best preceding vector index, etc. A random beamforming scheme based on PCSI selects users with a SINR greater than a threshold among a plurality of user terminals and transmits data thereto. The random beamforming scheme based on PCSI shows performance approximating that of the DPC method during multiplexing in the case where there is a large number of user terminals.

The PCSI scheme uses a plurality of random precoding vectors, the number of which corresponds to the number of transmit antennas. Specifically, a transmission signal of a base station is transmitted to a corresponding user terminal over a channel after being multiplied by a preceding signal. Each user terminal then calculates the SINR of a received channel to generate feedback information using an index of a preceding vector having the maximum SINR and an SINR of the preceding vector. The feedback information is then fed back to the base station. Thereafter, the base station, which has received the feedback information, selects, as multiuser terminals, a user terminal with the maximum SINR separately for each preceding vector. The base station then performs multiplexing using the selected multiuser terminals. In this case, if the number of users is insufficient, because the number of simultaneously transmitting users is equal to the number of transmit antennas, a multiplexing gain (throughput) is advantageously proportional to the number of transmit antennas of the terminal. However, the number of user terminals, which is needed to obtain a multiplexing gain proportional to the number of transmit antennas, exponentially increases with the number of transmit antennas. On the other hand, in a real-world environment where the number of user terminals is limited, because the number of multiuser terminals is equal to the number of transmit antennas, it is difficult to find a user terminal capable of avoiding inter-user interference. Therefore, an influence of the increase in interference increases with the number of multiuser terminals, causing a rare increase or an unexpected decrease in the throughput achieved by multiplexing.

SUMMARY OF THE INVENTION

An aspect of the present invention is to address at least the above-mentioned problems and/or disadvantages and to provide at least the advantages described below. Accordingly, an aspect of the present invention is to provide a multiuser scheduling method and apparatus for adaptively determining the number of multiuser terminals. The number of multiuser terminals are determined by taking into account the number of user terminals and an average Signal to Noise Ratio (SNR) of each user terminal when multiplexing transmit antennas and multiuser terminals. Thereby, selection diversity and multiplexing are maximized in a communication system.

Another aspect of the present invention is to provide a multiuser scheduling method and apparatus for determining the optimal number of multiple users after grouping user terminals with a similar average SNR when an average SNR of each user terminal is different.

Further another aspect of the present invention is to provide a multiuser scheduling method and apparatus for maximizing throughput by reducing inter-user interference by selectively using a subset of preceding vectors, capable of maximizing the throughput, among the generable random precoding vectors in the case where the number of multiuser terminals is less than the number of transmit antennas (assuming that the number of generable random precoding vectors is equal to the number of transmit antennas).

According to one aspect of the present invention, a method for scheduling multiuser terminals in a communication system is provided. The method includes receiving feedback information from a plurality of user terminals, selecting terminals having a maximum Signal to Interference plus Noise Ratio (SINR) among terminals having the same beam index and beam subset index, from among the plurality of user terminals, generating terminal groups using the selected terminals, each terminal group including terminals having the same beam subset index, calculating a throughput of each of the terminal groups to determine which terminal group has the maximum throughput, generating random beam vectors corresponding to terminals included in the terminal group determined to have the maximum throughput, and transmitting data for terminals, included in the terminal group determined to have the maximum throughput, over the corresponding generated random beam vectors.

According to another aspect of the present invention, a method for scheduling multiuser terminals in a communication system is provided. The method includes receiving feedback information from a plurality of user terminals, when each of the user terminals comprise a substantially different average Signal to Noise Ratio (SNR), generating terminal groups by grouping user terminals having a similar average SNR, selecting a terminal group based on an average SNR for each generated terminal group and the number of user terminals, generating random beam vectors corresponding to user terminals included in the selected terminal group, and simultaneously transmitting data for user terminals included in the selected terminal group over the generated random beam vectors.

According to further another aspect of the present invention, an apparatus for scheduling multiuser terminals in a communication system is provided. The apparatus includes a receiver for receiving feedback information from a plurality of user terminals, a user grouping unit for selecting terminals having a maximum Signal to Interference plus Noise Ratio (SINR) among terminals having the same beam index and beam subset index, from among the plurality of user terminals, and for generating terminal groups using the selected terminals, each terminal group including terminals having the same beam subset index, a group scheduling unit for calculating a throughput of each of the terminal groups to determine which terminal group has the maximum throughput, and a random preceding unit for generating random beam vectors corresponding to terminals included in the terminal group determined to have the maximum throughput, and for transmitting data for terminals, included in the terminal group determined to have the maximum throughput, over the corresponding generated random beam vectors.

According to yet another aspect of the present invention, there is provided an apparatus for scheduling multiuser terminals in a communication system is provided. The apparatus includes a receiver for receiving feedback information from a plurality of user terminals, a user grouping unit for, when each of the user terminals comprise a different average Signal to Noise Ratio (SNR), generating terminal groups by grouping user terminals having a similar average SNR, and a random preceding unit for selecting a terminal group based on an average SNR for each generated terminal group and the number of user terminals, for generating random beam vectors corresponding to user terminals included in the selected terminal group, and for simultaneously transmitting data for user terminals included in the selected terminal group over the generated random beam vectors.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following detailed description taken in conjunction with the accompanying drawings, in which.

DETAILED DESCRIPTION OF EXEMPLARY EMBODIMENTS

Figure 1:
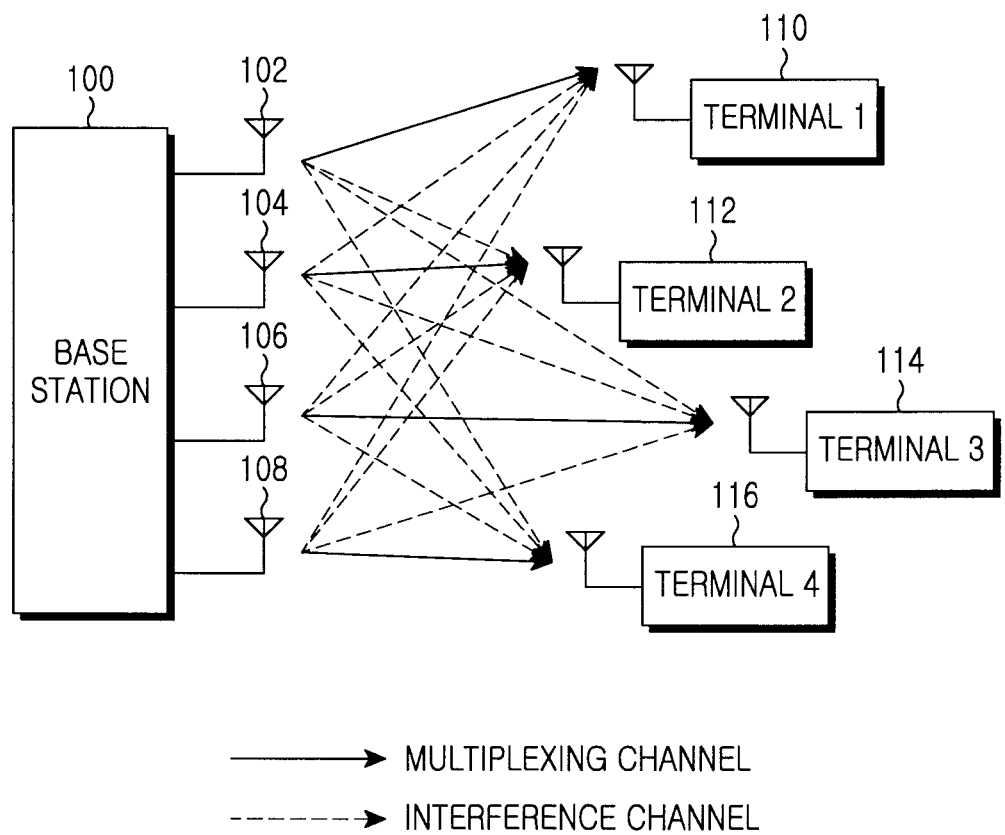
FIG. 1 is a diagram illustrating a conventional configuration of a MIMO communication system.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the exemplary embodiments described herein can be made without departing from the scope and spirit of the invention. Also, descriptions of well-known functions and constructions are omitted for clarity and conciseness. Terms used herein are defined based on functions in the exemplary embodiments of the present invention and may vary according to users, operators' intention or usual practices. Therefore, the definition of the terms should be made based on contents throughout the disclosure.

Exemplary embodiments of the present invention select the number of multiuser terminals, which are multiplexed with transmit antennas in a base station, so as achieve the maximum multiplexing effect. That is, when the number of user terminals is less than the number of transmit antennas, each user terminal calculates SINRs of precoding vectors (hereinafter referred to as 'beams'), generates partial channel information using an index of a beam with the maximum SINR and subset indexes including the beam index. The user terminals then feed back the partial channel information to the base station. Thereafter, the base station selects a subset of transmission beams having the optimal multiplexing effect from the partial channel information. The base station then transmits data to the corresponding terminals over the transmission beams constituting the subset.

Specifically, random beamforming multiplexing is applied in exemplary embodiments of the present invention by selecting user terminals with the maximum SINR separately for each beam index and by multiplexing the communications between the base station and the user terminals so that the signal power and channel gain increase and the interference between user terminals decreases.

When random beamforming multiplexing is implemented, only the users having a good channel gain are selected to acquire multiuser diversity in a Single Input Single Output (SISO) system.

On the other hand, when implementing random beamforming multiplexing in the Multiuser (MU)-MIMO system, since the user terminals are selected as multiple users that have a good channel gain and have low inter-user terminal interference, the multiuser diversity based on the number of user terminals significantly increases compared to the selection diversity of the SISO system. That is, in the ideal environment where the inter-user terminal interference can be minimized, a maximum multiplexing effect can be achieved. However, since the number of users in a cell is limited, the multiplexing effect is limited.

A description of an exemplary embodiment of the present invention will be given for the exemplary case where the number Q of multiple users is less than the number M of transmit antennas (Q<M) when an average SNR of the user terminals is equal.

In order to multiplex the Q multiuser terminals, a base station generates beam subsets (or antenna subsets) by grouping Q transmission beams among the transmission beams associated with channels for each of M transmit antennas. Thereafter, the base station receives partial channel information fed back from each of the user terminals, and depending thereon, selects among the grouped beam subsets a particular beam subset composed of a beam index that has the maximum SINR and can minimize inter-user terminal interference. When the number of user terminals is insufficient, the base station selects user terminals with a sufficiently great SINR as multiple users. Thereby a multiplexing gain is obtained by reducing the inter-user terminal interference. Here, the optimal number of multiple users, with which it is possible to obtain the maximum multiplexing effect and multiuser diversity gain, is determined according to the number of user terminals. That is, when the number of user terminals increases, there is a case where it is possible to sufficiently obtain multiplexing gain even though the number Q of multiple users is increased.

Therefore, it is possible to obtain the maximum data rate by adaptively determining the number of multiuser terminals according to an average SNR and the total number of user terminals, and selecting an optimal transmission beam subset.

Figure 2:
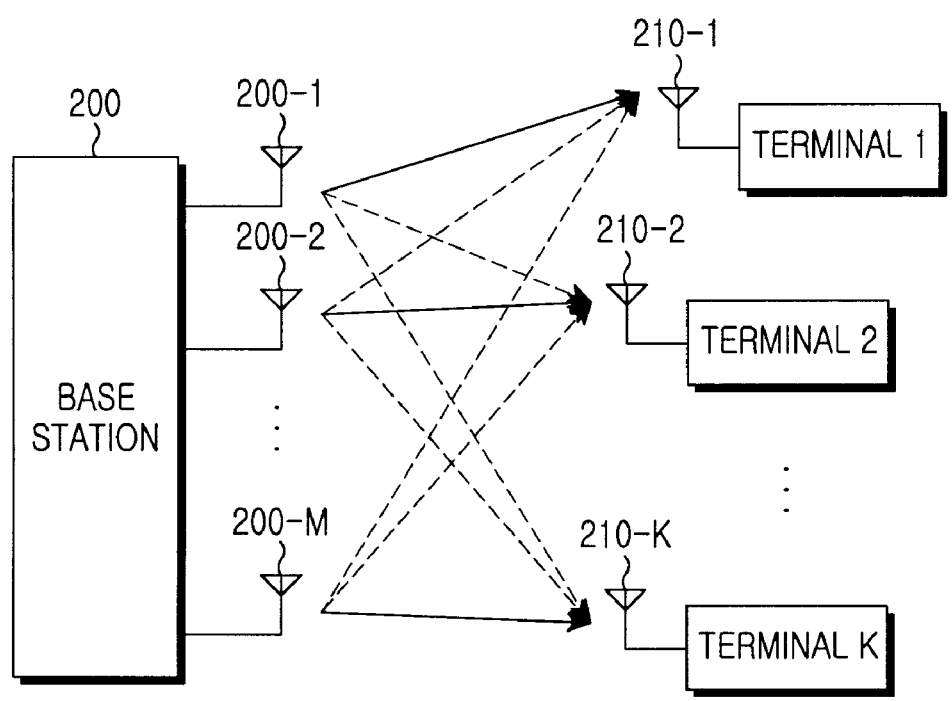
FIG. 2 is a diagram illustrating a connection structure between a base station and user terminals according to an exemplary embodiment of the present invention.

FIG. 2 is a diagram illustrating a connection structure between a base station and user terminals according to an exemplary embodiment of the present invention.

Referring to FIG. 2, although a description of the exemplary embodiment of present invention will be given for an exemplary case where K user terminals each have one receive antenna 210-1 ~210-K and a base station 200 has M transmit antennas 200-1 ~200-M, the exemplary embodiment of the present invention can be applied to the case where the number of receive antennas of each terminal is 2 or more.

Figure 3:
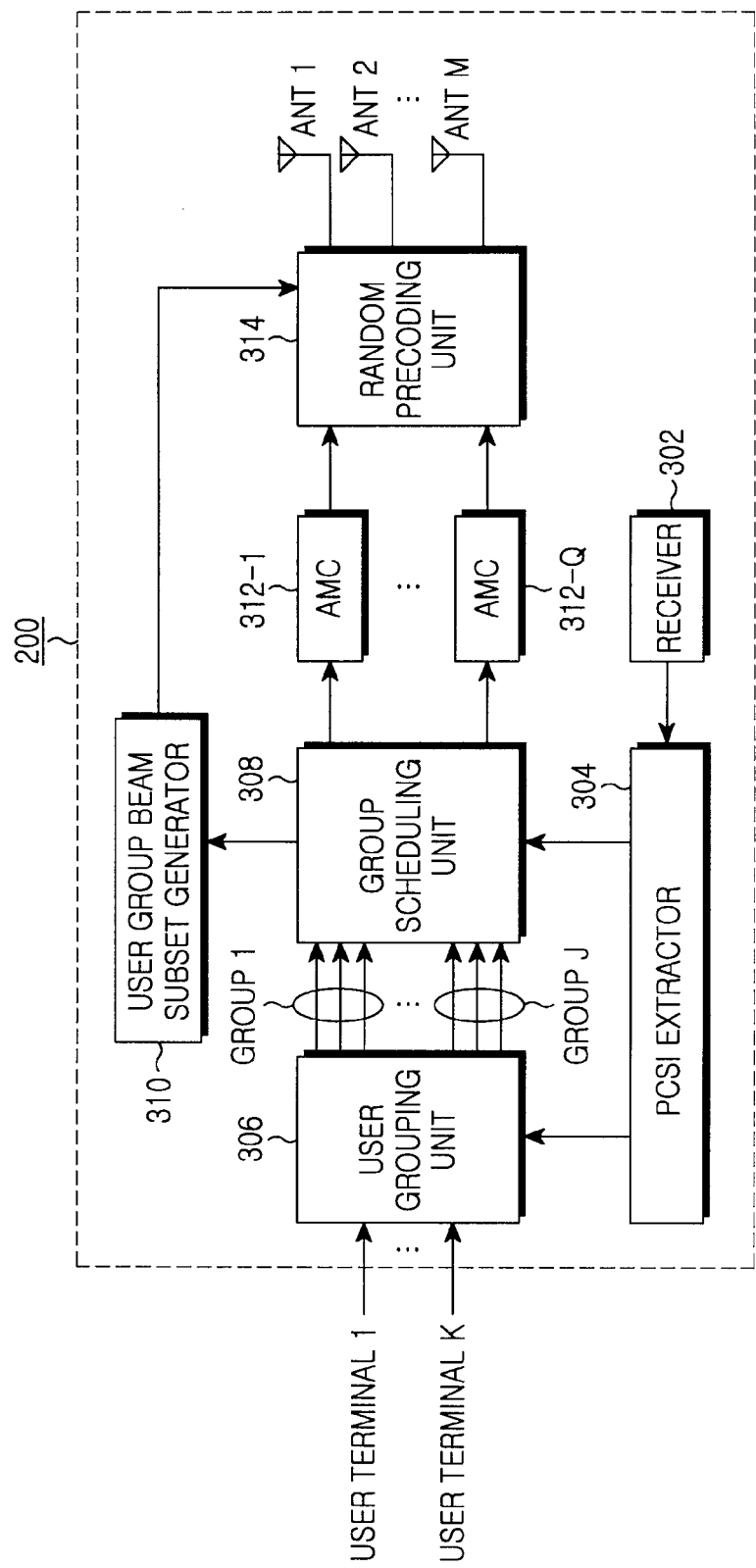
FIG. 3 is a diagram illustrating a detailed structure of a base station according to an exemplary embodiment of the present invention.

FIG. 3 is a diagram illustrating a detailed structure of a base station 200 according to an exemplary embodiment of the present invention.

Referring to FIG. 3, a base station 200 includes a receiver 302, a partial channel state information (PCSI) extractor 304, a user grouping unit 306, a group scheduling unit 308, a user group beam subset generator 310, Adaptive Modulation and Coding (AMC) units 312-1 ~312-Q, a random precoding unit 314 for generating and precoding random beams, and transmit antennas #1~#M.

The receiver 302 receives feedback information from user terminals, and delivers the received feedback information to the partial channel state information extractor 304. The feedback information includes a beam index having an SINR of each user terminal as a maximum value (i.e., beam index where an SINR of each user terminal is maximized), a subset index including the beam index, the SINR, etc. The SINR is calculated in accordance with Equation (3).

A process of generating the feedback information is as follows. Assuming that when there are M transmit antennas, it is possible to make M orthonormal random vectors and a random vector is precoded for each of Q users. In this case, it is possible to make a subset of beam indexes having $$J = \binom{M}{Q}$$

combinations. At this point, a subset of beam indexes is defined as $S_j \subset \{1, \ldots M\}$, $j=1, \ldots, J$. For example, when $M=4$, $Q=2$ and $J=6$, subsets of $S_1=\{1,2\}, S_2=\{1,3\}, S_3=\{1,4\}$, $S_4=\{2,3\}, S_5=\{2,4\}$, and $S_6=\{3,4\}$ are defined. At this point, a transmission signal is expressed as Equation (1) and a received signal based thereon is expressed as Equation (2). It is possible to calculate QJ SINRs according to a subset j and a beam index m belonging to the subset j. The maximum SINR among the QJ SINRs is calculated using Equation (4), and $m_k$ and $j_k$ are a beam index and a beam subset index, respectively.

The partial channel state information extractor 304 extracts, from the feedback information of each user terminal, a beam index having an SINR of the corresponding user terminal as a maximum value and a subset index including the beam index, and delivers the extracted indexes to the user grouping unit 306 and the group scheduling unit 308.

The user grouping unit 306 selects a user terminal having the greatest SINR that is being fed back from among the terminals having the same subset index and the same beam index among the K user terminals. The user grouping unit 306 generates J user terminal groups by grouping the terminals having the same subset index among the selected terminals, and then delivers the results to the group scheduling unit 308.

Based on the feedback information received from the partial channel state information extractor 304, the group scheduling unit 308 calculates a throughput calculated as a sum of data rates or a sum of scheduling metrics using SNR values of user terminals constituting a corresponding user terminal group among the J user terminal groups. The group scheduling unit 308 then selects a particular user terminal group having the maximum throughput. Thereafter, the group scheduling unit 308 delivers the particular user terminal group-related information to the user group beam subset generator 310 and the AMC units 312-1 ~312-Q. The user group beam subset generator 310 determines an optimal beam subset composed of beam indexes corresponding to user terminals belonging to the particular user terminal group, generates the optimal beam subset index, and delivers the optimal beam subset index to the random preceding unit 314.

Table 1 shows an example of feedback information of each user terminal when the base station performs random beamforming-based multiplexing with Q=2 user terminals using M=4 transmit antennas.

TABLE 1

| | User terminal | | | |
|---|---|---|---|---|
| | User terminal 1 | User terminal 2 | User terminal 3 | User terminal 4 |
| Beam index | 1 | 2 | 3 | 4 |
| Subset index | 2 | 5 | 2 | 5 |
| Subset | {1, 3} | {2, 4} | {1, 3} | {2, 4} |
| SINR (dB) | 5 | 7 | 6 | 8 |

The user grouping unit 306 defines user terminal groups having the same beam subset index using the feedback information of the user terminals, configured as shown in Table 1. Although not shown in Table 1, when there are user terminals having the same beam index and subset index, the user grouping unit 306 first selects a user terminal having a greater SINR in generating user terminal groups. That is, the user group beam subset generator 310 groups a user terminal 1 and a user terminal 3 having different beam indexes and the same subset index, as a first beam subset. Similarly, the user group beam subset generator 310 groups a user 2 and a user 4 having different beam indexes and the same subset index, as a second beam subset.

The user group beam subset generator 310 compares a summed SINR of the generated first beam subset with a summed SINR of the generated second beam subset, using SINR values of the user terminals #1 ~#4, received from the partial channel state information extractor 304. That is, since the summed SINR of the first beam subset is 11 and the summed SINR of the second beam subset is 15, the user group beam subset generator 310 selects the second beam subset with a greater SINR as an optimal beam subset, and delivers it to the random preceding unit 314.

Data symbols $S_m$ output from the AMC units 312-1~312-Q undergo preceding as shown in Equation (1) in the random precoding unit 314, and then are transmitted to a receiving terminal via transmit antennas.

$$x_j = \sum_{m \in S} v_m s_m, \; j = 1, \ldots J \quad (1)$$

where $S_m$ denotes the data symbol, and $v_m$ denotes an $m^{th}$ precoding vector and is one column vector of an orthogonal unitary random matrix having isotropic distribution.

Thereafter, the precoded transmission signal $x_j$ is received at a $k^{th}$ user terminal, which is one of the simultaneously transmitting user terminals, in the form of Equation (2).

$$y_{k,j} = \sqrt{\rho_k} \, h_k x_j + w_k \quad (2)$$
$$= \sum_{m \in S} \sqrt{\rho_k} \, h_k v_m s_m + w_k, \; j = 1, \ldots J$$

where $\rho_k$ denotes transmission power of the $k^{th}$ user terminal, $w_k$ denotes a Additive White Gaussian Noise (AWGN) having distribution of N(0,1), $h_k$ denotes a channel vector of the $k^{th}$ user terminal. For convenience, it is assumed that transmission powers of all users are equal ($\rho_1 = \ldots \rho_K = \rho$).

Equation (3) represents an SINR of an $m^{th}$ beam included in a $j^{th}$ beam subset of the $k^{th}$ user terminal.

$$SINR_{k,m,j} = \frac{|h_k v_m|^2}{\sum_{i \neq m, i \in S} |h_k v_i|^2 + 1/\rho}, \; \forall \, m \in S_j, \, \forall \, j \quad (3)$$

It is assumed herein that SINR varies according to the selected m and i ($i \in S$-(m)), and the user terminal can have information on channel gains ($h_k v_m$, m=1, ... ,M) of all transmit antennas.

The random preceding unit 314 generates random beams included in the optimal beam subset, and transmits data streams of user terminals included in the particular user terminal group via transmit antennas over the generated random beams.

Equation (4) is a formula for calculating the maximum SINR value of a $k^{th}$ terminal.

$$\gamma_k = \max_{1 \leq j \leq J} \max_{m \in S_j} SINR_{k,m,j} \quad (4)$$

Herein, the maximum SINR value $\gamma_k$, the selected beam subset index $j_k$, and the selected beam index $m_k$ are fed back. For Q<<M, in order to maximize the SINR in Equation (3), a channel gain of the received signal should be maximized and the amount of interference should be minimized. Therefore, if the random precoding unit 314 determines a beam index where $|h_k v_m|^2$ is maximized, and (Q−1) beam indexes where $|h_k v_i|^2$ is minimized, and feeds them back, the feedback overhead can be reduced, compared to the case where it the subset index is fed back.

Figure 4:
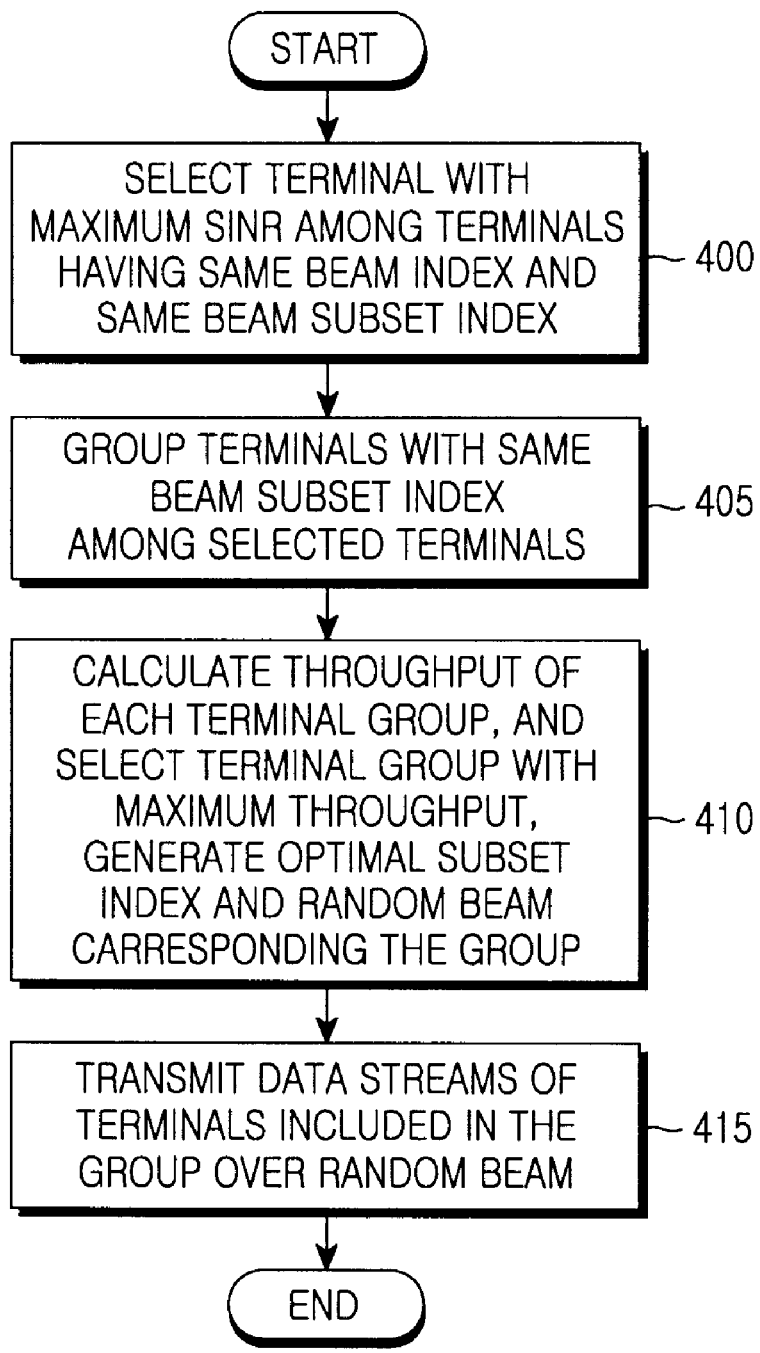
FIG. 4 is a flowchart illustrating an operation of a base station according to an exemplary embodiment of the present invention.
Figure 5A:
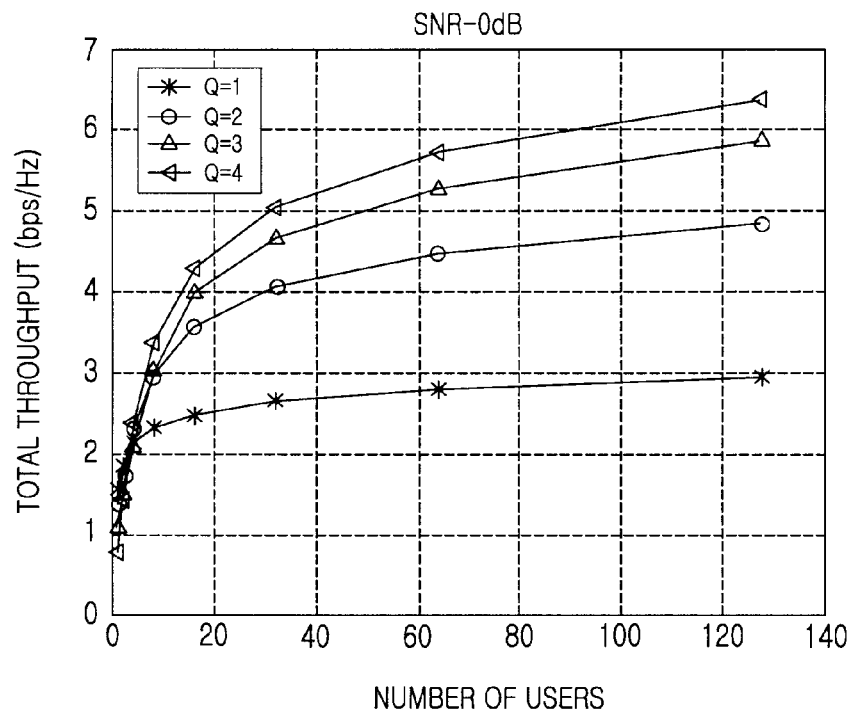
FIGS. 5A to 5D are graphs illustrating throughput comparison results obtained when SNR and the number of users, shown in Table 2, are changed according to an exemplary embodiment of the present invention.
Figure 5B:
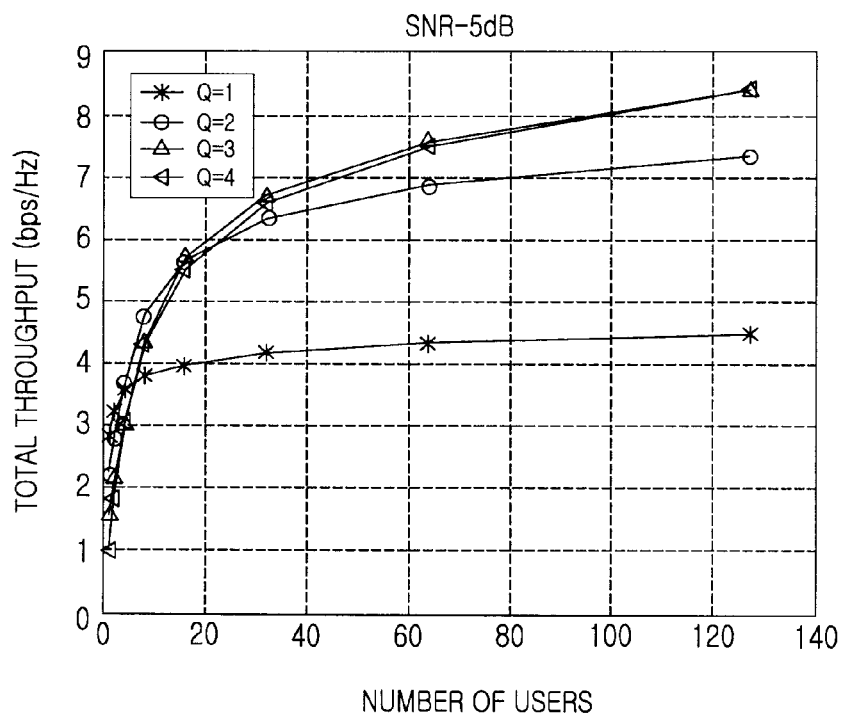
Figure 5C:
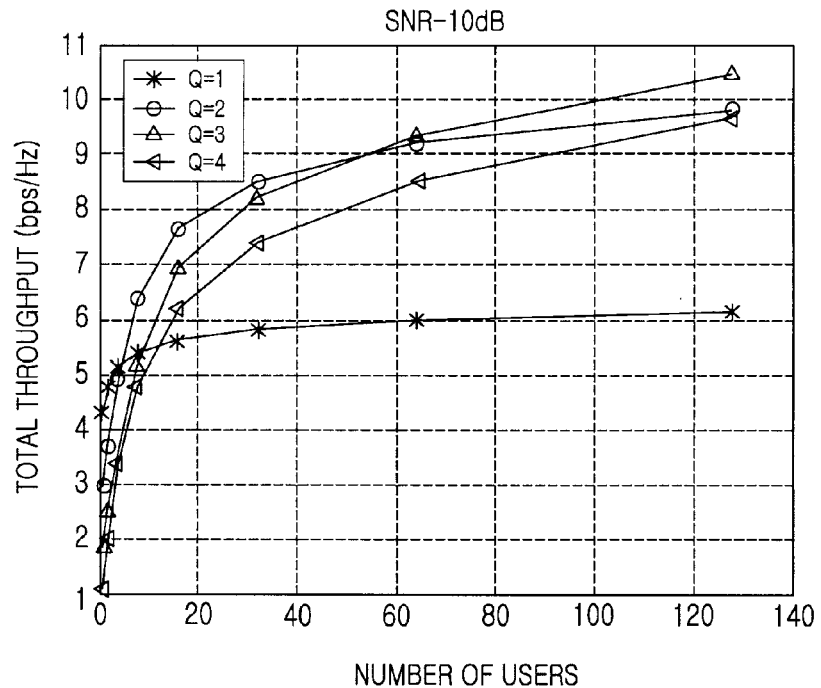
Figure 5D:
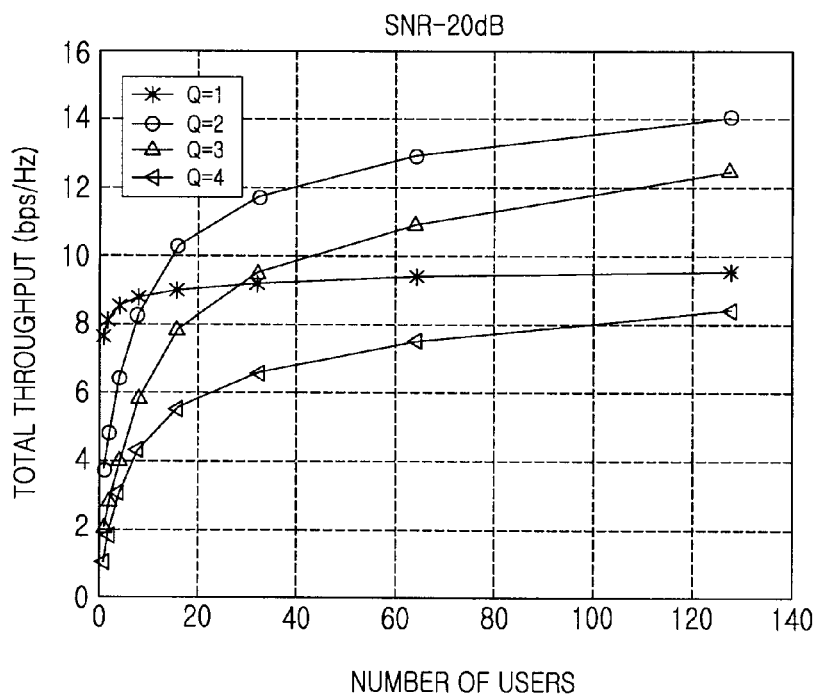

FIG. 4 is a flowchart illustrating an operation of a base station according to an exemplary embodiment of the present invention.

Referring to FIG. 4, a base station has received feedback information from user terminals. The feedback information includes a beam index $m_k$ having a maximum SINR of each user terminal as a maximum value, a subset index $j_k$ including the beam index, and the SINR $\gamma_k$. In step 400, the base station selects a user terminal having the maximum SINR among the user terminals having the same subset index and the same beam index among K user terminals, using the feedback information. In step 405, the base station generates terminal groups by grouping user terminals having the same subset index among the selected terminals. In step 410, the base station calculates throughput for each of the generated terminal groups, selects a particular terminal group, a sum of the calculated throughput of which is maximized, determines an optimal beam subset corresponding to the particular terminal group, and generates random beams of the optimal beam subset. In step 415, the base station transmits data streams of user terminals included in the particular terminal group via random beams included in the optimal beam subset.

In another exemplary embodiment of the present invention, when user terminals have different SNRs, a base station determines the number Q of multiuser terminals according to the SNRs of the user terminals. The base station first divides user terminals into a maximum of M terminal groups, and schedules user terminals in each terminal group in units of terminal groups. In this case, the base station can sequentially select a corresponding terminal group based on the terminal having the greatest scheduling metric among the user terminals in the terminal group, or using an average value of scheduling metrics of user terminals in the terminal group. In this case, regarding a terminal group including the user terminals having a low SNR, the multiplexing effect increases with an increase in the number of user terminals. Also, regarding a terminal group including the user terminals having a high SNR, the multiuser interference increases with a decrease in the number of user terminals, contributing to an increase in the multiplexing effect.

FIGS. 5A to 5D are graphs illustrating throughput comparison results obtained when SNR and the number of users, shown in Table 2, are changed.

TABLE 2

| SNR | Number of multiuser terminals | | | |
|---|---|---|---|---|
| (dB) | 1 | 2 | 3 | 4 |
| 0 dB | k < 2 | 2 < k < 4 | X | k > 4 |
| 5 dB | k < 4 | 4 < k < 16 | 16 < k < 128 | k > 128 |
| 10 dB | k < 4 | 4 < k < 64 | k > 64 | X |
| 20 dB | k < 8 | k > 8 | X | X |

Table 2 shows an interval of the number k of user terminals, which exhibits the maximum throughput. It is assumed herein that the number of base station's transmit antennas is 4 and the number of terminal receive antennas per terminal is 1.

Referring to Table 2 and FIGS. 5A to 5D, SNR is divided into 0 dB, 5 dB, 10 dB and 20 dB, and the throughput is represented in bits/sec/Hz while increasing k to 1, 2, 4, 8, 16, 32, 64 and 128.

For a low SNR, when the number of multiuser terminals is 4, a high-throughput interval is highest. It can be seen however that as SNR is increased, the maximum-throughput interval decreases or disappears. On the other hand, it can be seen that when the number of multiuser terminals is 1 or 2, the maximum-throughput interval is increased. That is, it can be appreciated that in each interval, compared to the existing combined method, the throughput is equal (maximum-throughput interval for the case where the number of multiuser terminals is 4) or higher (maximum-throughput interval for the case where the number of multiuser terminals is 1~3) according to the optimal number of multiuser terminals.

Figure 6A:
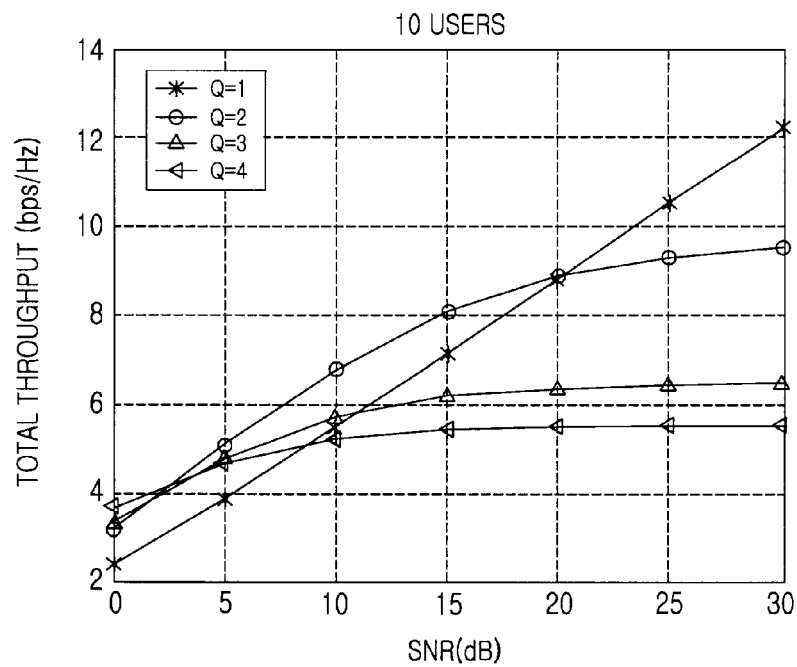
FIGS. 6A and 6B are graphs illustrating throughputs based on the number of users and SNR based on Table 3 according to an exemplary embodiment of the present invention.
Figure 6B:
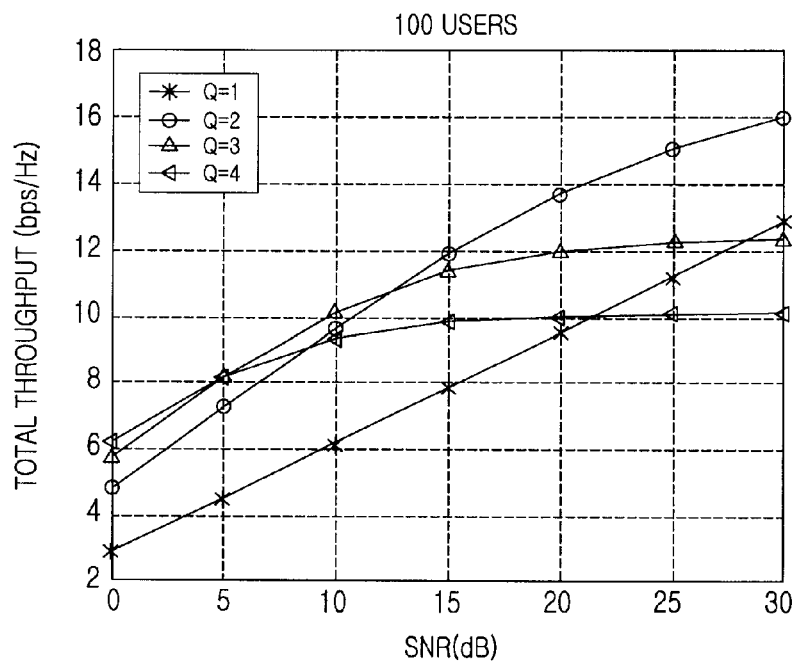

FIGS. 6A and 6B are graphs illustrating throughputs based on the number of users and SNR according to Table 3.

TABLE 3

| | Number of multiuser terminals | | | |
|---|---|---|---|---|
| k | 1 | 2 | 3 | 4 |
| k = 10 | SNR > 20 dB | 3 dB < SNR < 20 dB | X | SNR < 3 dB |
| k = 100 | X | SNR > 12 dB | 5 dB < SNR < 12 dB | SNR < 5 dB |

Referring to FIGS. 6A and 6B, when the number k of users is 10 and the number of multiuser terminals is 4, throughput is saturated after 5 dB. It can be seen however that when the number of multiuser terminals is 2, the throughput is lower at 0 dB than that in the case where the number of multiuser terminals is 4, but the throughput is highest after 5 dB and saturated after 20 dB. That is, it can be appreciated that at a high SNR, throughput is highest in the case where the number of simultaneously transmitting users is 1.

It can be understood from Table 2 and Table 3 that the number Q* of multiple users, which maximizes the throughput, varies according to the total number K of users and an average SNR. In order to determine the optimal number Q* of multiple users, the base station calculates an average throughput for each of Q=1, . . . ,M and determines Q which maximizes an average throughput $m \in S_p, j$. At this point, the base station feeds back a level ($|h_k v_m|^2$, m=1, . . . ,M) of a channel gain for each beam, and calculates an SINR using Equation (3) for all Ks to calculate throughput for each Q=1, . . . ,M. Because the base station can calculate SINR information for beams of all terminals, it calculates throughput through steps 405 to 415, skipping step 400 of FIG. 4. The base station finds a local average of the throughput for each Q=1, . . . ,M for a predetermined time interval and determines Q having the maximum local average as the optimal number Q* of multiuser terminals. Since the optimal number Q* of multiuser terminals varies according to the average SNR and the number of users as stated above, when there is a great change in the average SNR or the number of user terminals, the base station calculates again the optimal number Q* of multiuser terminals by repeating the above procedure.

Figure 7:
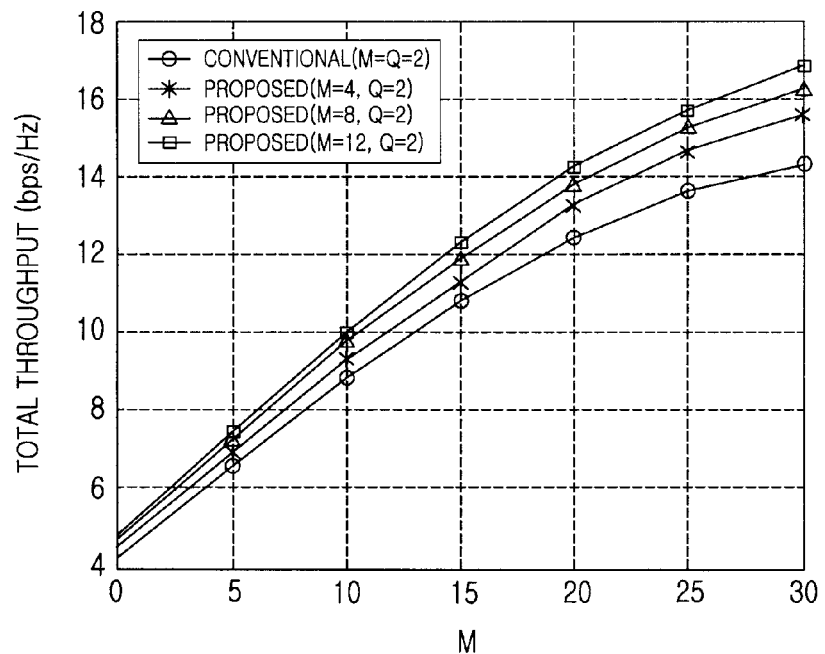
FIG. 7 is a graph illustrating an average SNR versus throughput based on a change in a value M according to an exemplary embodiment of the present invention.

FIG. 7 is a graph illustrating an average SNR versus throughput based on a change in a value M according to an exemplary embodiment of the present invention.

Referring to FIG. 7, when Q is fixed to 2 (Q=2) and the number of users is 100, an average SNR versus throughput based on a change in M=2, 4, 8 and 12 is represented in bits/sec/Hz. When M=2, the average SNR versus throughput is equal to that in the existing method where M=Q. It can be noted that as M increases, a degree of beam selection freedom increases, contributing to an increase in selection diversity gain and an increase in throughput.

Figure 8:
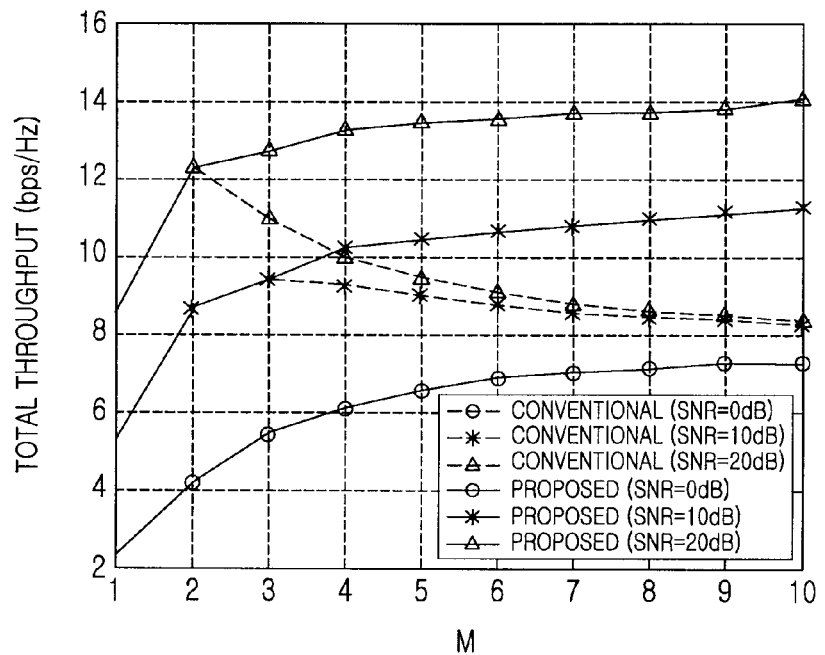
FIG. 8 is a graph illustrating throughput based on a change in a value M according to an exemplary embodiment of the present invention.

FIG. 8 is a graph illustrating throughput based on a change in a value M according to an exemplary embodiment of the present invention.

Referring to FIG. 8, when the number of users is 100, the throughput based on the change in M is represented in bits/sec/Hz. When an average SNR=0 dB, since a value of the noise/transmission signal power is much higher than the amount of interference of multiple users, SINR depends on the value of the noise/transmission signal rather than the amount of interference, so that the throughput increases with the number of multiple users. On the other hand, when SNR=10 dB or SNR=20 dB, because the number of multiple users is M in the existing method, a form of a block function is provided where if M increases, the amount of interference is greater than the value of the noise/transmission signal power, decreasing SINR, and as M increases, the throughput decreases after an increase. An apex of the block function is M=3 for SNR=10 dB, and M=2 for SNR=20 dB.

For example, in order to maximize the throughput, the exemplary embodiment of the present invention sets Q=3 (for M=3) for SNR=10 dB and Q=2 (for M>2) for SNR=20 dB, generates M random precoding vectors, and then schedules Q users by selecting an optimal number Q of random preceding vectors. In this case, it can be appreciated from FIG. 8 that as M increases, the selection diversity gain increases, contributing to an increase in throughput.

As is apparent from the foregoing description, exemplary embodiments of the present invention select the optimal number of multiuser terminals according to the SNR value and the number of user terminals, thereby minimizing interference between user terminals and thus contributing to an increase in the performance gain. In addition, when the number of user terminals is less than the number of transmit antennas, exemplary embodiments of the present invention generate a subset provided for selectively using transmission beams, so that even though the number of transmit antennas increases, the throughput increases through the selection diversity gain.

While the invention has been shown and described with reference to a certain exemplary embodiment thereof, it will be understood by those skilled in the art that various changes in form and details may be made therein without departing from the spirit and scope of the invention as defined by the appended claims and their equivalents.

What is claimed is:

1. A method for scheduling multiuser terminals in a communication system, the method comprising:
receiving, by a receiver, feedback information from a plurality of user terminals;
selecting user terminals having a maximum Signal to Interference plus Noise Ratio (SINR) among user terminals having the same beam index and beam subset index, from among the plurality of user terminals;
generating user terminal groups using the selected user terminals, each user terminal group including user terminals having the same beam subset index;
calculating a throughput of each of the user terminal groups to determine which user terminal group has the maximum throughput;
generating random beam vectors corresponding to user terminals included in the user terminal group determined to have the maximum throughput; and
transmitting data for user terminals, included in the user terminal group determined to have the maximum throughput, over the corresponding generated random beam vectors,
wherein the feedback information includes a beam index having an SINR for each of the plurality of user terminals as a maximum value and a beam subset index including the beam index, and
wherein the throughput of each of the user terminal groups is calculated based on at least one of a sum of data rates and a sum of scheduling metrics, using Signal to Noise Ratio (SNR) values of the user terminals constituting a corresponding user terminal group.

2. The method of claim 1, wherein each of the plurality of user terminals comprise a equal average SNR.

3. The method of claim 2, wherein an SINR of each of the plurality of user terminals is calculated using the following equation;

$$SINR_{k,m,j} = \frac{|h_k v_m|^2}{\sum_{i \neq m, i \in S} |h_k v_i|^2 + 1/\rho}, \forall m \in S_j, \forall j$$

where j denotes the beam subset index, k denotes a receive antenna index of the user termninal, and m and I denote transmission beam indexes.

4. The method of claim 3, wherein a maximum SINR of each of the user terminal groups is calculated using the following equation;

$$\gamma_k = \max_{1 \leq j \leq J} \max_{m \in S_j} SINR_{k,m,j}.$$

5. A method for scheduling multiuser terminals in a communication system, the method comprising:
receiving, by a receiver, feedback information from a plurality of user terminals;
when each of the user terminals comprise a substantially different average Signal to Noise Ratio (SNR), generating user terminal groups by grouping user terminals having a similar average SNR;
selecting a user terminal group based on an average SNR for each generated user terminal group and the number of user terminals;
generating random beam vectors corresponding to user terminals included in the selected user terminal group; and
simultaneously transmitting data for user terminals included in the selected user terminal group over the generated random beam vectors,
wherein the feedback information includes a beam index having a Signal to Interference plus Noise Ratio (SINR) for each of the plurality of user terminals as a maximum value and a beam subset index including the beam index, and
wherein a throughput of each of the user terminal groups is calculated based on at least one of a sum of data rates and a sum of scheduling metrics, using SNR values of the user terminals constituting a corresponding user terminal group.

6. An apparatus for scheduling multiuser terminals in a communication system, the apparatus comprising:
a receiver for receiving feedback information from a plurality of user terminals;
a user grouping unit for selecting user terminals having a maximum Signal to Interference plus Noise Ratio (SINR) among user terminals having the same beam index and beam subset index, from among the plurality of user terminals, and for generating user terminal groups using the selected user terminals, each user terminal group including user terminals having the same beam subset index;
a group scheduling unit for calculating a throughput of each of the user terminal groups to determine which user terminal group has the maximum throughput; and
a random precoding unit for generating random beam vectors corresponding to user terminals included in the user terminal group determined to have the maximum throughput, and for transmitting data for user terminals, included in the user terminal group determined to have the maximum throughput, over the corresponding generated random beam vectors,
wherein the feedback information includes a beam index having an SINR for each of the plurality of user terminals as a maximum value and a beam subset index including the beam index, and
wherein the group scheduling unit calculates the throughput of each of the user terminal groups based on at least one of a sum of data rates and a sum of scheduling metrics, using Signal to Noise Ratio (SNR) values of the user terminals constituting a corresponding user terminal group.

7. The apparatus of claim 6, wherein each of the plurality of the user terminals are equal average SNR.

8. The apparatus of claim 7, wherein an SINR of each of the plurality of user terminal is calculated using the following equation;

$$SINR_{k,m,j} = \frac{|h_k v_m|^2}{\sum_{i \neq m, i \in S} |h_k v_i|^2 + 1/\rho}, \forall m \in S_j, \forall j$$

where j denotes the beam subset index, k denotes a receive antenna index of the user terminal, and m and i denote transmission beam indexes.

9. The apparatus of claim 8, wherein a maximum SINR of each of the user terminal groups is calculated using the following equation;

$$\gamma_k = \max_{1 \le j \le J} \max_{m \in S_j} SINR_{k,m,j}.$$

10. An apparatus for scheduling multiuser terminals in a communication system, the apparatus comprising:
- a receiver for receiving feedback information from a plurality of user terminals;
- a user grouping unit for, when each of the user terminals comprise a substantially different average Signal to Noise Ratio (SNR), generating user terminal groups by grouping user terminals having a similar average SNR; and
- a random precoding unit for selecting a user terminal group based on an average SNR for each generated user terminal group and the number of user terminals, for generating random beam vectors corresponding to user terminals included in the selected user terminal group, and for simultaneously transmitting data for user terminals included in the selected user terminal group over the generated random beam vectors, wherein the feedback information includes a beam index having a Signal to Interference plus Noise Ratio (SINR) for each of the plurality of user terminals as a maximum value and a beam subset index including the beam index, and wherein a throughput of each of the user terminal groups is calculated based on at least one of a sum of data rates and a sum of scheduling metrics, using SNR values of the user terminals constituting a corresponding user terminal group.

* * * * *